United States Patent
Phillips, Jr.

[15] 3,689,922
[45] Sept. 5, 1972

[54] RADAR SYSTEM LOGIC CIRCUIT
[72] Inventor: Calvert F. Phillips, Jr., Annapolis, Md.
[73] Assignee: The United States of America as represented by the Secretary of Air Force,
[22] Filed: March 23, 1966
[21] Appl. No.: 538,173

[52] U.S. Cl. ............................343/17.1 R, 343/18 E
[51] Int. Cl. ..................................................G01s 7/28
[58] Field of Search ............................343/17.1, 18 E

[56] References Cited
UNITED STATES PATENTS
3,403,394   9/1968   Rouault.............343/17.1 R X Primary Examiner—T. H. Tubbesing
Attorney—Harry A. Herbert, Jr. and Julian L. Siegel

[57] ABSTRACT

A dual frequency radar system that automatically switches from a resistive mixer of two receiving channels to a peak value selector. The switching is determined by the presence of signals in each channel above a given threshold.

3 Claims, 2 Drawing Figures

RADAR SYSTEM LOGIC CIRCUIT

This invention relates to a dual frequency radar system and more particularly to a logic circuit for obtaining a high signal to noise ratio.

A radar system transmitting and receiving at two or more separate and distinct frequencies has a number of inherent advantages in both a jamming and non-jamming environment. To fully utilize these inherent advantages, it is necessary to employ receivers and logic circuits which will automatically provide optimum outputs. This invention presents two techniques which may be employed to automatically provide optimum outputs from a dual frequency radar system in either a jamming or a non-jamming environment with no manual selection required.

The majority of search radar systems used CFAR (Constant False Alarm Rate) receivers. CFAR receivers as the name applies provide a constant noise output independent of the type of jamming input, assuming proper receiver design. As a result, the logic circuits considered here are restricted to use with CFAR receivers.

In a non-jamming environment, the target return will be present in both receiving channels of the dual frequency system the majority of the time. Both receiving channels are assumed to have equal amplitude uncorrelated noise, as would be expected. Under this condition, linear resistive mixing produces optimum results in terms of maximum signal to noise ratio. If, however, jamming occurs at one of the two transmitting frequencies, the signal will be present in the unjammed channel only. Under these conditions resistive mixing is no longer desirable and the use of a peak selector, is desirable from the view point of producing an optimum signal to noise ratio in the output system. It may be seen that a swept jammer sweeping between the two radar frequencies would require a constant switching between the resistive mixer and the peak value selector unless an automatic logic selection circuit is employed.

It is therefore an object of this invention to provide a dual frequency radar system having a optimum output;

It is another object to provide a dual frequency radar system usable in either a jamming or non-jamming environment;

It is still another object to provide a dual frequency radar system using a logic circuit requiring no manual selection.

These and other advantages, features and objects of the invention will become more apparent from the following description taken in connection with the illustrative embodiments in the accompanying drawings, wherein.

Figure 1:
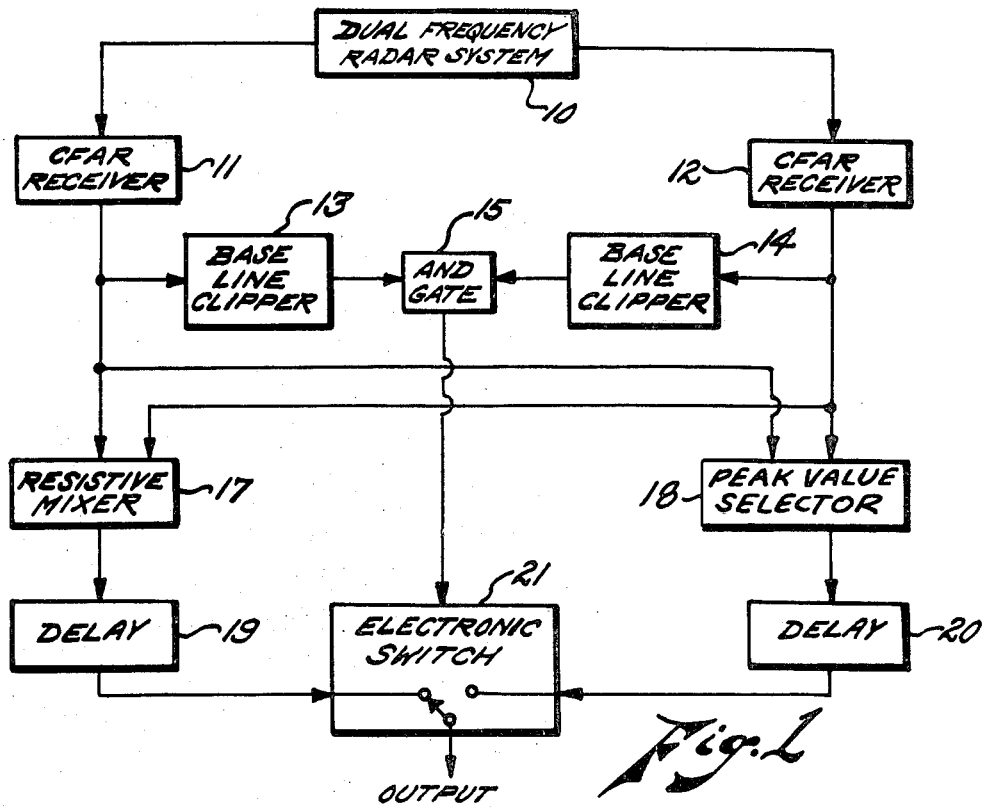
FIG. 1 is a block diagram of one embodiment of the invention.

Referring to FIG. 1, a logic circuit is shown employing "AND" gate 15 to furnish the information required to automatically control switch 21 for selecting either peak value selector 18 or resistive mixer 17. Delay lines 19 and 20 are interposed between resistive mixer 17 and peak value selector 18 respectively and electronic switch 21. In this system as long as a signal is present in both receiving channels 11 and 12 of dual frequency radar system 10 above the level set by the threshold setting of base line clippers 13 and 14, respectively, the signal appears in the output of "AND" gate 15 which in turn is used to gate electronic switch 21 to couple the output of resistive mixer 17. If the signal is not present in either or both receiving channels 11 and 12, there is no output from "AND" gate 15 and the output is taken from peak value selector 18. As a result, optimum performance of the system is automatically assured.

Figure 2:
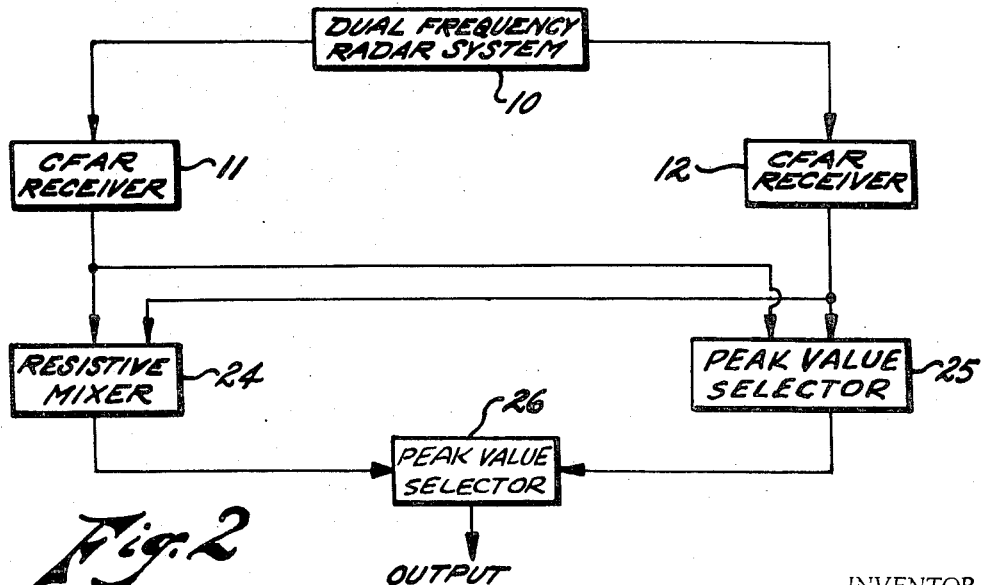
FIG. 2 is a block diagram of a second embodiment of the invention.

Referring to FIG. 2 another automatic selection system is shown. In this system, the output of either peak value selector 25 or resistive mixer 14 is applied to another peak value selector 26 which automatically produces a maximum output for signals in either or both of receiving channels 11 and 12. Although the system shown in FIG. 2 is appreciably simpler than the system shown in FIG. 1, in terms of circuit complexity, the system of FIG. 2 produces a degradation in the non-jamming signal to noise ratio. This degradation in signal to noise ratio is a result of the final peak selector 26 selecting the noise peaks of either resistive mixer 24 or peak value selector 25, which would in turn increase the peak noise to signal ratio in the output. In general, however, the slight degradation of the signal to noise ratio would be offset by the simplicity of the circuit of FIG. 2 as compared to FIG. 1.

I claim:

1. A dual frequency radar system employing a Constant False Alarm Rate comprising:
   a. a first and second receiver;
   b. a resistive mixer fed by the first and second receivers;
   c. a peak value selector fed by the first and second receivers;
   d. an electronic switch connecting alternately the outputs of the peak value selector and the resistive mixer;
   e. and an "AND" gate fed by the first and second receivers activating the electronic switch.

2. A dual frequency radar system according to claim 1 which further includes:
   a. base line clippers interposed between the first and second receivers and the "AND" gate;
   b. a first delay line interposed between the resistive mixer and the electronic switch;
   c. and a second delay line interposed between the peak value selector and the electronic switch.

3. A dual frequency radar system employing a Constant False Alarm Rate comprising:
   a. a first and second receiver;
   b. a resistive mixer fed by the first and second receivers;
   c. a first peak value selector fed by the first and second receivers;
   d. and a second peak value selector fed by the resistive mixer and the first peak value selector.

* * * * *